United States Patent
Ball, Jr. et al.

(10) Patent No.: US 9,470,145 B2
(45) Date of Patent: Oct. 18, 2016

(54) SYSTEM AND METHOD FOR HEATING FUEL IN A COMBINED CYCLE GAS TURBINE

(71) Applicant: General Electric Company, Schenectady, NY (US)

(72) Inventors: David Wesley Ball, Jr., Easley, SC (US); Korey Frederic Rendo, Greer, SC (US); Dean Matthew Erickson, Simpsonville, SC (US); Diego Fernando Rancruel, Mauldin, SC (US); Leslie Yung-Min Tong, Roswell, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 681 days.

(21) Appl. No.: 13/651,836

(22) Filed: Oct. 15, 2012

(65) Prior Publication Data

US 2014/0102071 A1   Apr. 17, 2014

(51) Int. Cl.
*F02C 7/224* (2006.01)
*F02C 6/06* (2006.01)

(52) U.S. Cl.
CPC ............... *F02C 6/06* (2013.01); *F02C 7/224* (2013.01); *Y02E 20/16* (2013.01)

(58) Field of Classification Search
CPC ........... F02C 6/06; F02C 7/224; Y02E 20/16
USPC .............................................. 60/736, 39.182
See application file for complete search history.

(56) References Cited

U.S. PATENT DOCUMENTS

| 3,334,486 | A | * | 8/1967 | Scholz ........................... 60/736 |
| 3,675,426 | A | | 7/1972 | Vidal et al. |
| 3,942,765 | A | | 3/1976 | Henrickson |
| 4,204,401 | A | | 5/1980 | Earnest |
| 5,845,481 | A | * | 12/1998 | Briesch et al. ................. 60/736 |
| 5,863,508 | A | | 1/1999 | Lachman et al. |
| 6,082,092 | A | | 7/2000 | Vandervort |
| 6,105,370 | A | * | 8/2000 | Weber ............................. 60/736 |
| 6,202,402 | B1 | | 3/2001 | Sattelmayer |
| 6,253,554 | B1 | | 7/2001 | Kobayashi et al. |
| 6,269,626 | B1 | | 8/2001 | Kim |
| 7,007,487 | B2 | | 3/2006 | Belokon et al. |
| 7,467,519 | B2 | | 12/2008 | Raybold et al. |
| 7,565,792 | B2 | | 7/2009 | Tanaka et al. |
| 7,874,156 | B2 | | 1/2011 | Wang et al. |
| 8,015,793 | B2 | | 9/2011 | Austin et al. |
| 8,020,366 | B2 | | 9/2011 | Cowan |
| 8,186,142 | B2 | | 5/2012 | Narayan et al. |
| 8,186,164 | B2 | | 5/2012 | Cowan |
| 8,534,073 | B2 | * | 9/2013 | Garcia-Crespo et al. ...... 60/736 |

(Continued)

FOREIGN PATENT DOCUMENTS

CN   101644178   2/2010

*Primary Examiner* — Ted Kim
(74) *Attorney, Agent, or Firm* — Dority & Manning, PA

(57) ABSTRACT

A system for heating fuel in a combined cycle gas turbine includes a fuel heat exchanger downstream from a turbine outlet, and the fuel heat exchanger has an exhaust gas inlet, an exhaust gas outlet, a fuel inlet, and a fuel outlet. A first exhaust gas plenum has a first exhaust gas inlet connection between the turbine outlet and a heat exchanger and a first exhaust gas outlet connection upstream from the exhaust gas inlet. A second exhaust gas plenum has a second exhaust gas inlet connection downstream from at least a portion of the heat exchanger and a second exhaust gas outlet connection upstream from the exhaust gas inlet.

19 Claims, 2 Drawing Sheets

(56) References Cited

U.S. PATENT DOCUMENTS

| | | | |
|---|---|---|---|
| 8,677,729 B2* | 3/2014 | Bilton et al. | 60/736 |
| 2008/0155984 A1* | 7/2008 | Liu et al. | 60/649 |
| 2009/0229271 A1 | 9/2009 | De Ruyck et al. | |
| 2009/0235634 A1* | 9/2009 | Wang et al. | 60/39.182 |
| 2009/0284013 A1* | 11/2009 | Anand | F02C 3/34 60/39.5 |
| 2010/0024429 A1 | 2/2010 | Zhang et al. | |
| 2013/0086882 A1* | 4/2013 | Anand | F02C 3/34 60/39.52 |
| 2014/0102105 A1 | 4/2014 | Janapaneedi et al. | |

* cited by examiner

SYSTEM AND METHOD FOR HEATING FUEL IN A COMBINED CYCLE GAS TURBINE

FIELD OF THE INVENTION

The present invention generally involves a system and method for heating fuel in a combined cycle gas turbine.

BACKGROUND OF THE INVENTION

Gas turbines are widely used in industrial and commercial operations. A typical gas turbine includes an inlet section, a compressor section, a combustion section, a turbine section, and an exhaust section. The inlet section cleans and conditions a working fluid (e.g., air) and supplies the working fluid to the compressor section. The compressor section increases the pressure of the working fluid and supplies a compressed working fluid to the combustion section. The combustion section mixes fuel with the compressed working fluid and ignites the mixture to generate combustion gases having a high temperature and pressure. The fuel supplied to the combustion section may be a liquid fuel, a gaseous fuel, or a combination of liquid and gaseous fuels. The combustion gases flow to the turbine section where they expand to produce work. For example, expansion of the combustion gases in the turbine section may rotate a shaft connected to a generator to produce electricity.

The combustion gases exiting the turbine section as exhaust gases generally have considerable residual heat that may be extracted prior to discharge to the environment to further enhance the overall efficiency of the gas turbine. In a combined cycle gas turbine, the exhaust section may include a heat recovery steam generator or other heat exchanger to extract additional heat energy from the exhaust gases to produce steam which may in turn be used to generate power. In addition, the exhaust gases flowing through the exhaust section may be diverted to a fuel heat exchanger to heat the fuel supplied to the combustion section to enhance the efficiency of the combustion and reduce undesirable emissions of nitrous oxides ($NO_x$).

The temperature of the exhaust gases may vary depending on the various operating conditions of the combined cycle gas turbine. For example, during initial startup of the gas turbine, the temperature of the exhaust gases may not be high enough to supply heat to both the fuel heat exchanger and the heat recovery steam generator. Alternately, during normal gas turbine operations, the heat recovery steam generator may need to be isolated from exposure to the exhaust gases, for example, to support scheduled or unplanned maintenance or repairs to the heat recovery steam generator. As a result, a system and method for heating the fuel using the exhaust gases over a wide range of operating conditions would be useful.

BRIEF DESCRIPTION OF THE INVENTION

Aspects and advantages of the invention are set forth below in the following description, or may be obvious from the description, or may be learned through practice of the invention.

One embodiment of the present invention is a system for heating fuel in a combined cycle gas turbine, the combined cycle gas turbine having a turbine outlet and a heat exchanger downstream from the turbine outlet. The system includes a fuel heat exchanger downstream from the turbine outlet, and the fuel heat exchanger has an exhaust gas inlet, an exhaust gas outlet, a fuel inlet, and a fuel outlet. A first exhaust gas plenum has a first exhaust gas inlet connection between the turbine outlet and the heat exchanger and a first exhaust gas outlet connection upstream from the exhaust gas inlet. A second exhaust gas plenum has a second exhaust gas inlet connection downstream from at least a portion of the heat exchanger and a second exhaust gas outlet connection upstream from the exhaust gas inlet.

Another embodiment of the present invention is a system for heating fuel in a combined cycle gas turbine, the combined cycle gas turbine having a turbine outlet and a heat exchanger downstream from the turbine outlet. The system includes a fuel heat exchanger downstream from the turbine outlet, and the fuel heat exchanger has an exhaust gas inlet and an exhaust gas outlet. The system further includes means for controlling an exhaust gas flow to the heat exchanger. A second exhaust gas plenum has a second exhaust gas inlet connection downstream from at least a portion of the heat exchanger and a second exhaust gas outlet connection upstream from the exhaust gas inlet.

In yet another embodiment, a system for heating fuel in a gas turbine includes a compressor, a combustor downstream from the compressor, a turbine downstream from the combustor, and a heat exchanger downstream from the turbine. A fuel heat exchanger is downstream from the turbine and has an exhaust gas inlet and an exhaust gas outlet. A first exhaust gas plenum has a first exhaust gas inlet connection between the turbine and the heat exchanger and a first exhaust gas outlet connection upstream from the exhaust gas inlet. A second exhaust gas plenum has a second exhaust gas inlet connection downstream from at least a portion of the heat exchanger and a second exhaust gas outlet connection upstream from the exhaust gas inlet.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
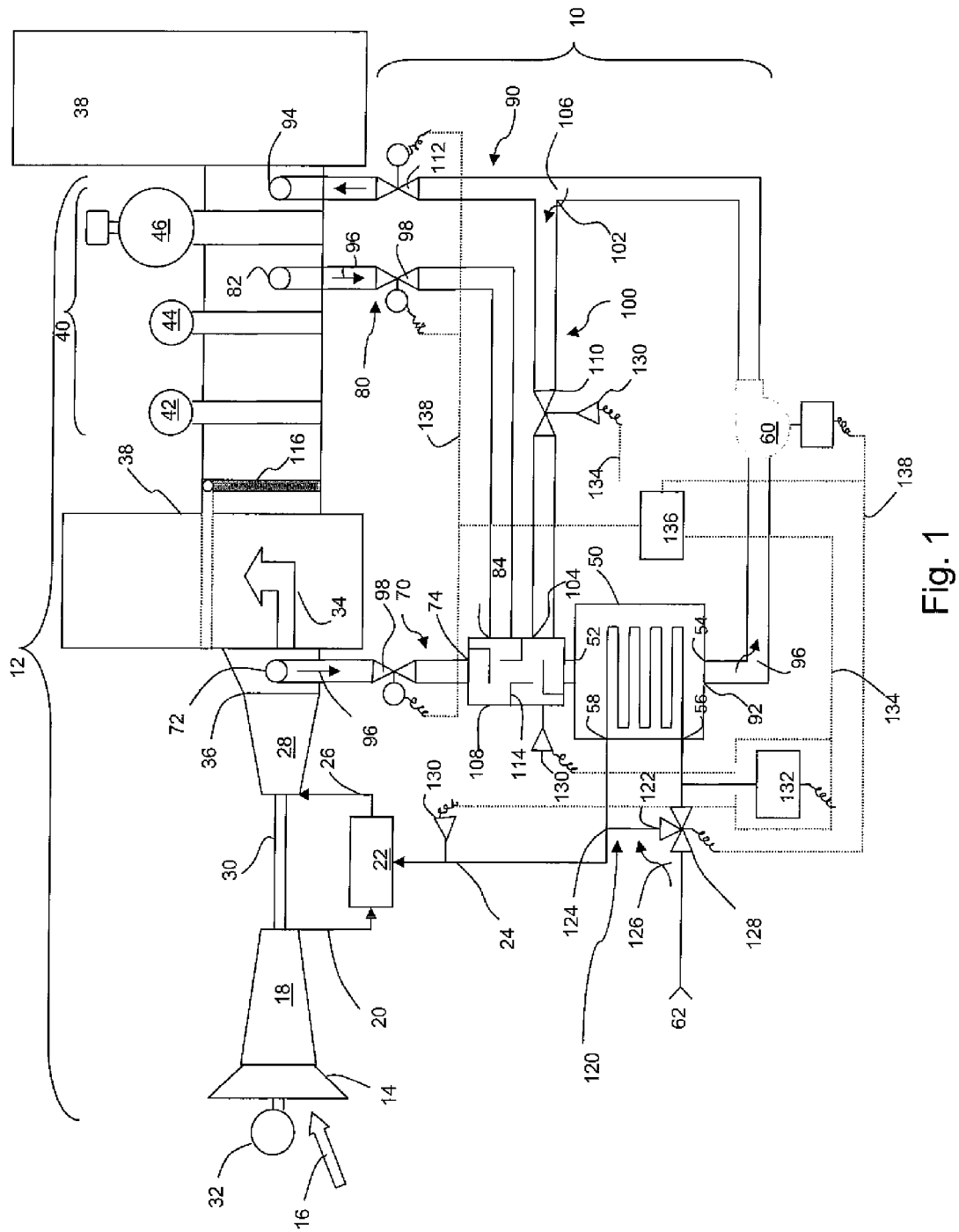
FIG. 1 is a block diagram of a system for heating fuel during startup according to an embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for heating fuel in a combined cycle gas turbine. The combined cycle gas turbine generally includes a gas turbine with a turbine outlet and a heat exchanger downstream from the turbine outlet. The system and method generally include a fuel heat exchanger downstream from the turbine outlet and one or more exhaust gas plenums connected upstream and/or downstream from the heat exchanger that supply exhaust gases to the fuel heat exchanger. In particular embodiments, the system and method may further include an exhaust gas recirculation plenum, a mixing plenum, and/or means for controlling the exhaust gas flow to the heat exchanger, through the exhaust gas plenums, and/or through the exhaust gas recirculation plenum. Although particular embodiments of the present invention may be described and illustrated generally in the context of a gas turbine, one of ordinary skill in the art will readily appreciate from the teachings herein that embodiments of the present invention may be used with other turbo-machines, and the present invention is not limited to gas turbines unless specifically recited in the claims.

Figure 2:
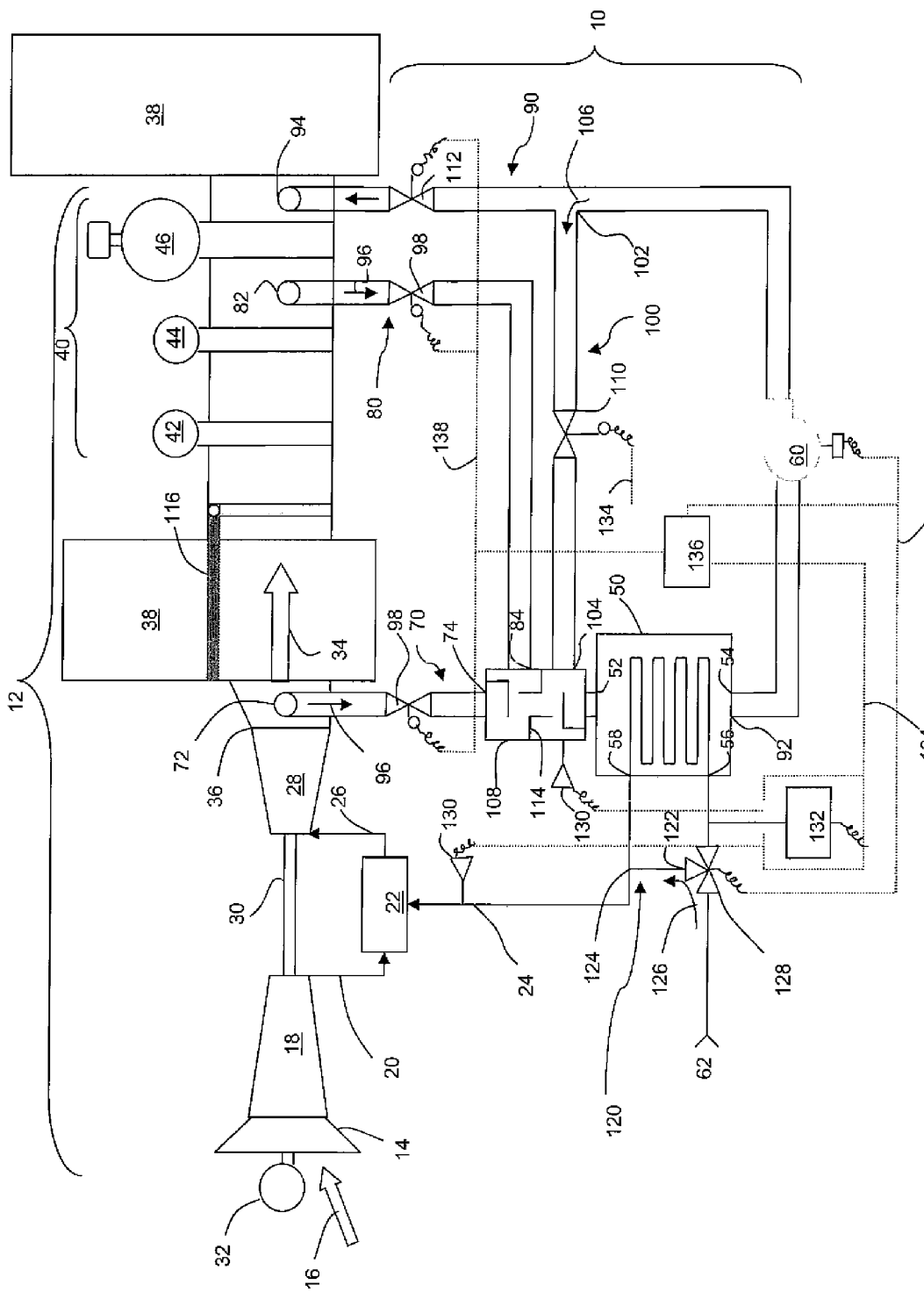
FIG. 2 is a block diagram of the system shown in FIG. 1 during normal operations.

FIGS. 1 and 2 provide functional block diagrams of a system 10 for heating fuel in a combined cycle gas turbine 12 according to one embodiment of the present invention during different modes of operation. As shown, the gas turbine 12 generally includes an inlet section 14 that may include a series of filters, cooling coils, moisture separators, and/or other devices to purify and otherwise condition a working fluid (e.g., air) 16 entering the gas turbine 12. The working fluid 16 flows to a compressor 18, and the compressor 18 progressively imparts kinetic energy to the working fluid 16 to produce a compressed working fluid 20 at a highly energized state. The compressed working fluid 20 flows to one or more combustors 22 where it mixes with a fuel 24 before combusting to produce combustion gases 26 having a high temperature and pressure. The combustion gases 26 flow through a turbine 28 to produce work. For example, a shaft 30 may connect the turbine 28 to the compressor 18 so that operation of the turbine 28 drives the compressor 18 to produce the compressed working fluid 20. Alternately or in addition, the shaft 30 may connect the turbine 28 to a generator 32 for producing electricity.

Exhaust gases 34 from the turbine 28 flow through a turbine outlet 36 that may connect the turbine 28 to one or more exhaust stacks 38 downstream from the turbine 28. The exhaust stack 38 may include, for example, a heat recovery steam generator or other heat exchanger 40 downstream from the turbine outlet 36 for extracting additional heat from the exhaust gases 34 prior to release to the environment. As shown in FIGS. 1 and 2, the heat exchanger 40 may include multiple steam generators arranged in series or stages to progressively extract heat from the exhaust gases 34. For example, the heat exchanger 40 may include a high pressure steam generator 42, followed by an intermediate steam generator 44 and a low pressure steam generator 46. The high pressure steam generator 42 may be regularly exposed to exhaust gas 34 temperatures of 1,100 degrees Fahrenheit or more, while the exhaust gases 34 flowing across the low pressure steam generator 46 may have cooled to 480 degrees Fahrenheit or less.

The fuel 24 supplied to the combustors 22 may include any available fuel known to one of ordinary skill in the art. Possible fuels 24 may include, for example, blast furnace gas, coke oven gas, natural gas, methane, vaporized liquefied natural gas (LNG), hydrogen, syngas, butane, propane, olefins, diesel, petroleum distillates, and combinations thereof. In general, heating liquid fuel prior to combustion enhances mixing with the compressed working fluid 20 and allows more complete combustion of leaner fuel-air mixtures.

As shown in FIGS. 1 and 2, the system 10 may include a fuel heat exchanger 50 downstream from the turbine outlet 36 that receives at least a portion of the exhaust gases 34 flowing out of the turbine outlet 36 to transfer heat from the exhaust gases 34 to the fuel 24 prior to combustion. The fuel heat exchanger 50 generally includes an exhaust gas inlet 52, an exhaust gas outlet 54, a fuel inlet 56, and a fuel outlet 58. A blower 60 in the system 10 may augment the differential pressure of the exhaust gases 34 across the fuel heat exchanger 50 so that the exhaust gases 34 may flow through the fuel heat exchanger 50 from the exhaust gas inlet 52 to the exhaust gas outlet 54. In particular embodiments, the blower 60 may have variable speeds to adjust the flow rate and/or differential pressure of the exhaust gases 34 across the fuel heat exchanger 50. Fuel 24 from a fuel supply system 62 may similarly flow through the fuel heat exchanger 50 from the fuel inlet 56 to the fuel outlet 58. In this manner, the fuel heat exchanger 50 may transfer residual heat from the exhaust gases 34 to the fuel 24 to heat the fuel 24 to a desired temperature.

The system 10 further includes one or more exhaust gas plenums that connect at various points downstream from the turbine outlet 36 to divert a portion of the exhaust gases 34 through the fuel heat exchanger 50 and back to the exhaust stack 38. For example, the system 10 may include a first exhaust gas plenum 70 having a first exhaust gas inlet connection 72 between the turbine outlet 36 and the heat exchanger 40 and a first exhaust gas outlet connection 74 upstream from the exhaust gas inlet 52. The system 10 may also include a second exhaust gas plenum 80 having a second exhaust gas inlet connection 82 downstream from at least a portion of the heat exchanger 40 and a second exhaust gas outlet connection 84 upstream from the exhaust gas inlet 52. Lastly, the system 10 may include a third exhaust gas plenum 90 having a third exhaust gas inlet connection 92 downstream from the exhaust gas outlet 54 and a third exhaust gas outlet connection 94 downstream from at least a portion of the heat exchanger 40 to provide fluid communication between the exhaust gas outlet 54 and the exhaust stack 38.

The system 10 may further include various means for controlling an exhaust gas flow 96 through the first and second plenums 70, 80. The function of the means is to control or regulate the amount of the exhaust gases 96 diverted through the first and/or second plenums 70, 80 to the fuel heat exchanger 50. The structure associated with performing this function may include any combination of one or more globe valves, gate valves, butterfly valves, ball valves, dampers, or other variable orifices known in the art for alternately permitting or preventing fluid flow. For example, in the particular embodiment shown in FIGS. 1 and 2, the structure for controlling the exhaust gas flow 96 through the first and second plenums 70, 80 may be supply valves 98 located in each plenum 70, 80 to control or regulate the amount of exhaust gases 96 diverted from the exhaust stack 38. In other particular embodiments, the supply valves 98 may be combined in function into a three-way valve with a separate input from each plenum 70, 80 and a single output to the fuel heat exchanger 50. The three-way valve may include a combination of globe valves, gate valves, butterfly valves, ball valves, dampers, or other variable orifices known in the art for combining fluid flow from two flow paths into one flow path.

The temperature of the fuel 24 entering the fuel heat exchanger 50 may be above, below, or equal to ambient temperature. In contrast, the temperature of the exhaust gases 96 flowing through the second exhaust gas plenum 80 may be over 480 degrees Fahrenheit, and the temperature of the exhaust gases 96 flowing through the first exhaust gas plenum 70 may be 1,100 degrees Fahrenheit or more. This large temperature difference between the exhaust gases 96 and the fuel 24 may create undesirable thermal stresses in the fuel heat exchanger 50. As shown in FIGS. 1 and 2, the system 10 may include an attemperator in the form of an exhaust gas recirculation plenum 100 to reduce the temperature of the exhaust gases 96 entering the exhaust gas inlet 52. The exhaust gas recirculation plenum 100 may include a recirculation inlet connection 102 downstream from the exhaust gas outlet 54 and a recirculation outlet connection 104 upstream from the exhaust gas inlet 52. Specifically, the recirculation inlet connection 102 may intersect with the third exhaust gas plenum 90 upstream from the third exhaust gas outlet connection 94, and the recirculation outlet connection 104 may intersect with the first and/or second exhaust gas plenums 70, 80 between the exhaust gas inlet 52 and the first and/or second exhaust gas inlet connections 72, 82.

As shown in FIGS. 1 and 2, the system 10 may further include means for controlling a recirculated exhaust gas flow 106 from the exhaust gas outlet 54 into the exhaust gas recirculation plenum 100 and a mixing plenum 108 at the recirculation outlet connection 104. The function of the means for controlling the recirculated exhaust gas flow 106 from the exhaust gas outlet 54 into the exhaust gas recirculation plenum 100 is to control or regulate the amount of exhaust gas flow 96 that flows from the exhaust outlet 54 and enters the exhaust gas recirculation plenum 100. The structure associated with performing this function may include any combination of one or more control valves, throttle valves, dampers, and/or sensors known to one of ordinary skill in the art for regulating fluid flow in a system. For example, in the particular embodiment shown in FIGS. 1 and 2, the structure for performing this function is a throttle valve 110 in the exhaust gas recirculation plenum 100. The throttle valve 110 may be a globe valve, gate valve, butterfly valve, ball valve, damper, or other variable orifice known in the art for controlling fluid flow. Alternately or in addition, a return valve 112 in the third exhaust gas plenum 90 may assist in controlling or regulating the amount of recirculated exhaust gas flow 106 through the exhaust gas recirculation plenum 100. In still further embodiments, the throttle valve 110 and the return valve 112 may be combined in function into a three-way valve with a single input from the exhaust gas outlet 54 with separate outputs into either the exhaust gas recirculation plenum 100 or the third exhaust gas outlet connection 94. The three-way valve may include a combination of globe valves, gate valves, butterfly valves, ball valves, dampers, or other variable orifices known in the art for dividing or distributing fluid flow from one flow path into two flow paths.

The mixing plenum 108 may be a chamber, tank, or other suitable volume with one or more baffles 114 therein and/or downstream from the mixing plenum 108 to enhance mixing between the relatively hotter exhaust gases 96 flowing through the first and/or second exhaust gas plenums 70, 80 and the relatively cooler recirculated exhaust gas flow 106 flowing through the exhaust gas recirculation plenum 100. In this manner, the combination of the exhaust gas recirculation plenum 100 and/or the mixing plenum 108 may attemperate the temperature of the exhaust gases 96 before they reach the exhaust gas inlet 52 of the fuel heat exchanger 50 to reduce thermal stresses across the fuel heat exchanger 50. In addition, the exhaust gas recirculation plenum 100 and/or the mixing plenum 108 may also keep the exhaust gas 96 temperature below the auto-ignition temperature associated with gaseous fuels and below the coking temperature associated with liquid fuels.

In particular embodiments, the system 10 may further include means for controlling the exhaust gas 34 flow to the heat exchanger 40 to support different operating conditions of the gas turbine 12. The function of the means for controlling the exhaust gas 34 flow to the heat exchanger 40 is to alternately prevent or permit or in some cases regulate the exhaust gas 34 flow across the heat exchanger 40. The structure associated with performing this function may include any combination of one or more control valves, throttle valves, dampers, and/or sensors known to one of ordinary skill in the art for regulating fluid flow in a system. For example, in the particular embodiment shown in FIGS. 1 and 2, the structure for performing this function is a damper 116 in the exhaust stack 38. The damper 116 may be positioned in the exhaust stack 38 upstream or downstream from the heat exchanger 40 to prevent or permit exhaust gas 34 flow across the heat exchanger 40, depending on the particular operating mode of the gas turbine 12. As shown in FIG. 1, for example, the damper 116 may be positioned in a first position to prevent exhaust gas 34 flow across the heat exchanger 40. This first position may be used, for example, during maintenance or repairs to the heat exchanger 40 or during startup of the gas turbine 12 when the exhaust gas 34 temperature is not high enough to support heat exchanger 40 operations. As shown in FIG. 2, the damper 116 may be positioned in a second position to permit exhaust gas 34 flow across the heat exchanger 40 to extract additional heat from the exhaust gases 34 and enhance overall efficiency of the combined cycle gas turbine 12.

Referring to the bottom left side of FIGS. 1 and 2, the fuel 24 flows from the fuel supply system 62 through the fuel inlet and outlet 56, 58 of the fuel heat exchanger 50 to pick up residual heat from the exhaust gases 96 flowing through the fuel heat exchanger 50. The type of fuel 24, its associated Wobbe Index for gas fuel, and/or its viscosity for liquid fuel are factors that may be used to determine the desired temperature for the fuel 24 for enhancing combustion. As shown in FIGS. 1 and 2, a fuel bypass plenum 120 allows a portion of the fuel 24 to bypass the fuel heat exchanger 50 to achieve a desired temperature for the fuel 24. The fuel bypass plenum 120 may include a fuel bypass inlet 122 upstream from the fuel inlet 56 to the fuel heat exchanger 50 and a fuel bypass outlet 124 downstream from the fuel outlet 58 from the fuel heat exchanger 50.

The system 10 may further include means for controlling a bypass fuel flow 126 into the fuel bypass plenum 120. The function of the means is to control or regulate the amount of bypass fuel flow 126 that enters the fuel bypass plenum 120. The structure for controlling the bypass fuel flow 126 into the fuel bypass plenum 120 may include any combination of one or more control valves, throttle valves, and/or sensors known to one of ordinary skill in the art for regulating fluid flow in a system. For example, in the particular embodiment shown in FIGS. 1 and 2, the structure for controlling the bypass fuel flow 126 into the fuel bypass plenum 120 is a three-way valve 128 at the fuel bypass inlet 122. The three-way valve 128 may include a combination of globe valves, gate valves, butterfly valves, ball valves, or other variable orifices known in the art for dividing or distributing fluid flow from one flow path into two flow paths. In alternate embodiments, the structure for controlling the bypass fuel flow 126 into the fuel bypass plenum 120 may include a separate throttle valve in the fuel bypass plenum 120, upstream from the fuel inlet 56, and/or downstream from the fuel outlet 58.

The various supply valves 98, recirculation throttle valve 110, return valve 112, three-way valve 128, and/or blower 60 speed may be manually or remotely operated. For example, one or more temperature sensors 130, Wobbe index meters 132, calorimeters, viscometers, and/or other sensors may provide signals 134 reflective of the exhaust gas 96 temperature and fuel 24 properties at various locations in the system 10. A controller 136 may receive the signals 134 and generate one or more control signals 138 to remotely control the positions of the various exhaust gas valves 98, 110, 128, three-way valve 128, and/or blower 60 speed to achieve a desired temperature and/or Wobbe index for the fuel 24. The technical effect of the controller 136 is to compare the signals 134 reflective of the exhaust gas 96 temperature and fuel 24 properties to a predetermined condition (e.g., fuel temperature, exhaust gas flow, etc.) and generate the control signal 138 for operating the various valves 98, 110, 112, 128 and blower 60 speed. As used herein, the controller 136 may comprise any combination of microprocessors, circuitry, or other programmed logic circuit and is not limited to any particular hardware architecture or configuration. Embodiments of the systems and methods set forth herein may be implemented by one or more general-purpose or customized controllers 136 adapted in any suitable manner to provide the desired functionality. The controller 136 may be adapted to provide additional functionality, either complementary or unrelated to the present subject matter. For instance, one or more controllers 136 may be adapted to provide the described functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the systems and methods set forth and disclosed herein may also be implemented by hard-wired logic or other circuitry, including, but not limited to application-specific circuits. Of course, various combinations of computer-executed software and hard-wired logic or other circuitry may be suitable, as well.

The embodiment shown in FIGS. 1 and 2 may also provide a method for heating the combustor fuel 24 that enhances efficiency by recovering residual heat from the exhaust gases 34. The method may include, for example, flowing the exhaust gases 34 through the turbine outlet 36 or exhaust stack 38 and diverting at least a portion of the exhaust gases 96 through the first and/or second exhaust gas plenums 70, 80 to the fuel heat exchanger 50 downstream from the turbine outlet 36. In particular embodiments, the method may further include controlling the exhaust gas flow 96 through the first and second exhaust gas plenums 70, 80 and/or controlling the exhaust gas flow 34 to the heat exchanger 40.

The method may further include flowing a portion of the exhaust gases 96 through the exhaust gas recirculation plenum 100 and controlling or regulating the recirculated exhaust gas flow 106 into the exhaust recirculation plenum 100 to attemperate the exhaust gases 96 reaching the fuel heat exchanger 50. Alternately or in addition, the method may include mixing the exhaust gases 96 with the recirculated exhaust gas flow 106 in the mixing plenum 108 at the recirculation outlet connection 104. In addition, the method may include bypassing a portion of the fuel 126 through the fuel bypass plenum 120 and around the fuel heat exchanger 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A system for heating fuel in a combined cycle gas turbine, comprising:
   a combustor;
   a turbine having an outlet, wherein an exhaust gas flow from the turbine exits the outlet;
   a heat recovery steam generator in fluid communication with the turbine outlet;
   a first exhaust gas plenum in fluid communication at a junction with the turbine outlet;
   a second exhaust gas plenum in fluid communication at a junction with the heat recovery steam generator;
   a mixing chamber in fluid communication with the first exhaust gas plenum and the second exhaust gas plenum; and
   a fuel heat exchanger in fluid communication with the mixing chamber;
   wherein a first portion of the exhaust gas flow is directed from the turbine outlet through the first exhaust gas plenum to the mixing chamber, a second portion of the exhaust gas flow is directed from the heat recovery steam generator through the second exhaust gas plenum to the mixing chamber, and the first portion of the exhaust gas flow and the second portion of exhaust gas flow form a blended flow in the mixing chamber that is directed from the mixing chamber directly to the fuel heat exchanger; and
   wherein at least some of the blended flow exiting the fuel heat exchanger bypasses the combustor and flows directly to the mixing chamber, the blended flow exiting the fuel heat exchanger and directed to rejoin the exhaust gas flow from the turbine outlet at a connection point that is fluidly downstream of the turbine outlet and at least one of the junctions of the first exhaust gas plenum and the second exhaust gas plenum.

2. The system as in claim 1, further comprising means for controlling the exhaust gas flow through the first exhaust gas plenum and the second exhaust gas plenum.

3. The system as in claim 1, further comprising means for controlling the exhaust gas flow to the heat recovery steam generator.

4. The system as in claim 1, further comprising an exhaust gas recirculation plenum in fluid communication with the mixing chamber and the fuel heat exchanger.

5. The system as in claim 4, further comprising means for controlling a recirculated exhaust gas flow from the fuel heat exchanger into the exhaust gas recirculation plenum.

6. The system as in claim 4, wherein the mixing chamber comprises a baffle therein.

7. The system as in claim 1, further comprising a third exhaust gas plenum in fluid communication with the fuel heat exchanger and at least a portion of the heat recovery steam generator.

8. The system as in claim 1, further comprising a fuel bypass plenum including a fuel bypass inlet upstream from said fuel heat exchanger and a fuel bypass outlet downstream from said fuel heat exchanger.

9. The system as in claim 8, further comprising:
means for controlling a bypass fuel flow into the fuel bypass plenum.

10. A system for heating fuel in a combined cycle gas turbine, comprising:
a combustor;
a turbine outlet disposed downstream from a turbine, wherein an exhaust gas flow from the turbine exits the turbine outlet;
a heat recovery steam generator in fluid communication with the turbine outlet;
means for controlling the exhaust gas flow to the heat recovery steam generator;
a first exhaust gas plenum in fluid communication at a junction with the turbine outlet;
a second exhaust gas plenum in fluid communication at a junction with the heat recovery steam generator;
a mixing chamber in fluid communication with the first exhaust gas plenum and the second exhaust gas plenum; and
a fuel heat exchanger in fluid communication with the mixing chamber;
wherein a first portion of the exhaust gas flow is directed from the turbine outlet through the first exhaust gas plenum to the mixing chamber, a second portion of the exhaust gas flow is directed from the heat recovery steam generator through the second exhaust gas plenum to the mixing chamber, and the first portion of the exhaust gas flow and the second portion of exhaust gas flow form a blended flow in the mixing chamber that is directed from the mixing chamber directly to the fuel heat exchanger; and
wherein at least some of the blended flow exiting the fuel heat exchanger bypasses the combustor and flows directly to the mixing chamber, the blended flow exiting the fuel heat exchanger and directed to rejoin the exhaust gas flow from the turbine outlet at a connection point that is fluidly downstream of the turbine outlet and at least one of the junctions of the first exhaust gas plenum and the second exhaust gas plenum.

11. The system as in claim 10, further comprising means for controlling the exhaust flow through the first exhaust gas plenum and the second exhaust gas plenum.

12. The system as in claim 10, wherein the mixing chamber comprises a baffle therein.

13. The system as in claim 10, further comprising an exhaust gas recirculation plenum in fluid communication with the mixing chamber and the fuel heat exchanger.

14. The system as in claim 13, further comprising means for controlling a recirculated exhaust gas flow from the fuel heat exchanger into the exhaust gas recirculation plenum.

15. The system as in claim 10, further comprising a third exhaust gas plenum in fluid communication with the fuel heat exchanger and at least a portion of the heat recovery steam generator.

16. A system for heating fuel in a gas turbine, comprising:
a compressor;
a combustor;
a turbine comprising a turbine outlet where an exhaust gas flow exits a turbine;
a heat recovery steam generator in fluid communication with the turbine outlet;
a first exhaust gas plenum in fluid communication at a junction with the turbine outlet;
a second exhaust gas plenum in fluid communication at a junction with the heat recovery steam generator;
a mixing chamber in fluid communication with the first exhaust gas plenum and the second exhaust gas plenum; and
a fuel heat exchanger in fluid communication with the mixing chamber;
wherein a first portion of the exhaust gas flow is directed from the turbine outlet through the first exhaust gas plenum to the mixing chamber, a second portion of the exhaust gas flow is directed from the heat recovery steam generator through the second exhaust gas plenum to the mixing chamber, and the first portion of the exhaust gas flow and the second portion of exhaust gas flow form a blended flow in the mixing chamber that is directed from the mixing chamber directly to the fuel heat exchanger; and
wherein at least some of the blended flow exiting the fuel heat exchanger bypasses the combustor and flows directly to the mixing chamber, the blended flow exiting the fuel heat exchanger and directed to rejoin the exhaust gas flow from the turbine outlet at a connection point that is fluidly downstream of the turbine outlet and at least one of the junctions of the first exhaust gas plenum and the second exhaust gas plenum.

17. The system as in claim 16, further comprising means for controlling the exhaust gas flow through the first exhaust gas plenum and the second exhaust gas plenum.

18. The system as in claim 16, further comprising means for controlling the exhaust gas flow to the heat recovery steam generator.

19. The system as in claim 16, further comprising an exhaust gas recirculation plenum in fluid communication with the mixing chamber and the fuel heat exchanger.

* * * * *